July 31, 1923.

R. T. NEWTON

SHOCK ELIMINATOR

Filed June 2, 1920

1,463,766

INVENTOR
RICHARD T. NEWTON
BY
Howson and Howson
ATTORNEYS

Patented July 31, 1923.

1,463,766

UNITED STATES PATENT OFFICE.

RICHARD T. NEWTON, OF NEW YORK, N. Y.

SHOCK ELIMINATOR.

Application filed June 2, 1920. Serial No. 385,919.

*To all whom it may concern:*

Be it known that I, RICHARD T. NEWTON, a citizen of the United States of America, residing at New York city, in the county of New York and State of New York, have invented certain new and useful Improvements in Shock Eliminators, of which the following is a specification.

My invention relates to shock eliminators, and particularly to a device of this type adapted to be applied to motor cars, and interposed between the usual chassis side bars and the main leaf spring commonly attached directly thereto. The particular object of my invention is to improve the shock eliminator illustrated in my prior Patent No. 1,279,482, dated September 17, 1918, by affording in addition to the vertical cushioning action previously attained, a cushioned longitudinal play between the main spring and chassis which eliminates the shock due to impedance of the forward throw of the car.

In the accompanying drawings—

Figure 1:
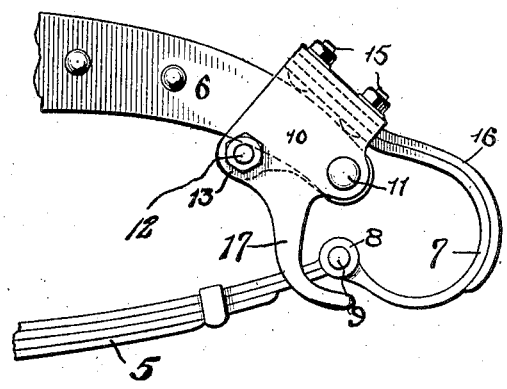
Figure 2:
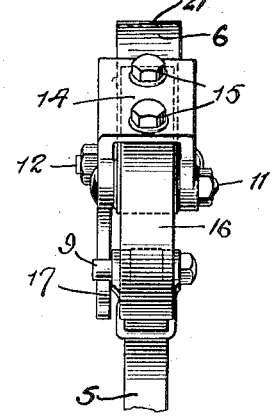
Figure 3:
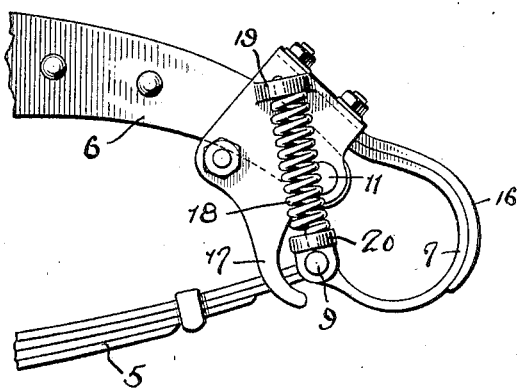
Figure 4:
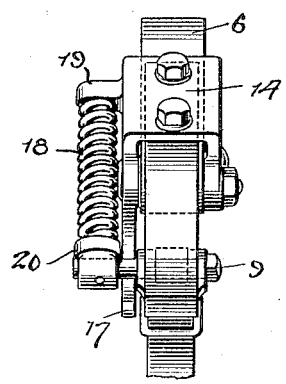

Figs. 1 and 2 are respectively side and front elevations of a shock eliminator in which my invention is embodied in one form; and Figs. 3 and 4 are similar views of a modified construction.

In the construction indicated in my prior patent above referred to, the link interposed between the end of the main spring and the chassis side bar, or an extension bracket thereon, forms a rocking lever, with which is associated a spring to cushion the upward thrusts of the main spring. The connection between the parts, however, is longitudinally unyielding, and only vertical thrusts are taken care of. When the running wheels encounter an obstruction, however, such as a cross rut in the road, they are not only thrown upward, but their forward progress is suddenly impeded, and when the connection with the chassis is not subject to longitudinal play, as in the construction illustrated in said patent, the chassis is subjected to the same sudden impedance to its forward progress, with resulting forward throw of the occupants of the car. The object of the present invention is to provide a flexible cushioned connection between the leaf spring and the chassis which will permit a certain relative longitudinal displacement of these parts, thus cushioning the impedance shocks, as well as the vertical shocks, due to unevenness in the road bed.

In the form shown in Figs. 1 and 2, I have interposed between the main spring 5 and the chassis 6, a shock eliminator 7. This is preferably formed from spring strap metal bent to more or less C shape, and provided at one end with an eye 8 connected to the leaf spring by a pivot pin 9, while its other end is anchored in any suitable way to the end of the horn of the chassis side bar 6. For this purpose I have indicated a channel-section bracket 10 straddling the horn of the chassis, with which it is engaged by the usual spring bolt 11, and a cross bolt 12 passing beneath the side bar 6 and through downwardly extending cheeks 13 on the bracket. The upper end of the spring 7 lies beneath the bridge 14 of the channel 10 and is secured thereto by bolts 15. A reenforcing leaf spring 16 overlies the spring 7 and strengthens it. I also provide a downwardly extending finger 17 on one or both sides of the channel bracket 10, which lies in the path of the end or ends of the pin 9 and prevents excessive strain on the spring. Obviously this lug is not an essential.

In operation, the vertical thrusts of the main spring are cushioned by the flexing of the ends of the spring 7—16, which approach each other under the direct compression strains. The longitudinal impedance thrusts, however, displace the ends longitudinally with relation to each other; causing the lower or main-spring end of the eliminator to momentarily lag behind, while the upper or chassis end advances with relation thereto. The incidental strain is imposed almost wholly upon the upper leg of the spring. Under these strains the spring is therefore distorted in the direction of its length as distinguished from the mere flexing of its legs incidental to compression strains.

It will be understood of course that under actual operating conditions both strains are ordinarily imposed upon the spring at the same time, and that its flexion is consequently the resultant of the two components mentioned.

In Figs. 3 and 4 I have indicated a modified construction which affords an auxiliary coil spring 18 interposed between the lug 19 on the bracket 10 and an abutment seat 20 mounted on the extended end of the pin 17.

While the function of the spring 7 is not altered, its resistance to vertical shock is reenforced by the coil spring 18. In this construction the spring 18 corresponds substantially to similar springs of my patent above mentioned, while the impedance spring 7 affords a spring-link connection between the end of the main spring 5 and the chassis 6.

The particular construction and arrangement of the parts may be variously modified without departing from what I claim as my invention. In any event, however, I contemplate a self-contained attachment adapted to be installed upon a car by merely disconnecting the end of the main spring 5 from the horn of the chassis 6, and operatively interposing therebetween a shock eliminator having the essential characteristics of this invention.

I claim—

1. The combination with a chassis side bar having a spring bolt and a main spring having an eye adapted to receive said spring bolt, of a shock eliminator comprising a bracket adapted to be mounted on the end of the chassis side bar and engaged by said spring bolt, and a C-shaped leaf spring rigidly secured at one end to said bracket, and pivoted at its other end to the eye of the main supporting spring.

2. The combination with a chassis side bar having a spring bolt and a main spring having an eye adapted to receive said spring bolt, of a shock eliminator comprising a bracket adapted to be mounted on the end of the chassis side bar and engaged by said spring bolt, and a C-shaped leaf spring rigidly secured at one end to said bracket, and pivoted at its other end to the eye of the main supporting spring, together with a stop lug on the bracket and a cooperating abutment associated with the main spring and normally spaced from the stop lug, but serving to limit the longitudinal displacement of the chassis with respect to the main spring.

3. The construction with a chassis side bar having a spring bolt and a main spring having an eye adapted to receive said spring bolt, of a shock eliminator comprising a bracket adapted to be mounted on the end of the chassis side bar and engaged by said spring bolt, and a C-shaped leaf spring rigidly secured at one end to said bracket, and pivoted at its other end to the eye of the main supporting spring, together with a compression spring arranged between the bracket and the main spring and serving to reinforce the C-shaped spring against vertical thrusts.

4. The combination with a chassis side bar having a downwardly extending terminal horn, and a main supporting spring having an end substantially vertically aligned with the end of said horn, but spaced therefrom, of a C-shaped leaf spring secured at one end to the chassis horn and at its other end to the end of the leaf spring, said shock eliminator spring being yieldable both vertically and longitudinally for the purposes set forth.

5. The combination with a chassis side bar having a downwardly extending terminal horn, and a main supporting spring having an end substantially vertically aligned with the end of said horn, but spaced therefrom, of a C-shaped leaf spring secured at one end to the chassis horn and at its other end to the end of the leaf spring, said shock eliminator spring being yieldable both vertically and longitudinally for the purposes set forth, said leaf spring comprising a plurality of leaves attached to the chassis, only certain of said leaves being connected to the main supporting spring.

6. A self-contained shock eliminator attachment for automobiles, comprising a bracket adapted to be secured to the horn of a chassis side bar, and a generally C-shaped leaf spring rigidly secured at one end to said bracket, and having an eye at its opposite end adapted to be arranged in register with the eye of the main supporting spring of the vehicle below the end of the chassis side bar to receive a transverse bolt passing therethrough.

7. A self-contained shock eliminator attachment for automobiles, comprising a bracket adapted to be secured to the horn of a chassis side bar, and a generally C-shaped leaf spring rigidly secured at one end to said bracket, and having an eye at its opposite end adapted to be arranged in register with the eye of the main supporting spring of the vehicle below the end of the chassis side bar to receive a transverse bolt passing therethrough, said bracket having a downwardly extending abutment lug normally spaced from but adapted to engage said bolt on the longitudinal displacement of the chassis with respect to the spring.

8. A self-contained shock eliminator attachment for automobiles, comprising a bracket adapted to be secured to the horn of a chassis side bar, and a generally C-shaped leaf spring rigidly secured at one end to said bracket, and having an eye at its opposite end adapted to be arranged in register with the eye of the main supporting spring of the vehicle below the end of the chassis side bar to receive a transverse bolt passing therethrough, said bracket having a lateral abutment lug, and said bolt having an abutment member, together with a coil spring arranged between said abutments for the purpose set forth.

In testimony whereof I have signed my name to this specification.

RICHARD T. NEWTON.